S. SBOROWITZ.
PROCESS OF MAKING ARTIFICIAL STONE AND PRODUCT OBTAINED THEREBY.
APPLICATION FILED JULY 3, 1912.
1,074,983.  Patented Oct. 7, 1913.
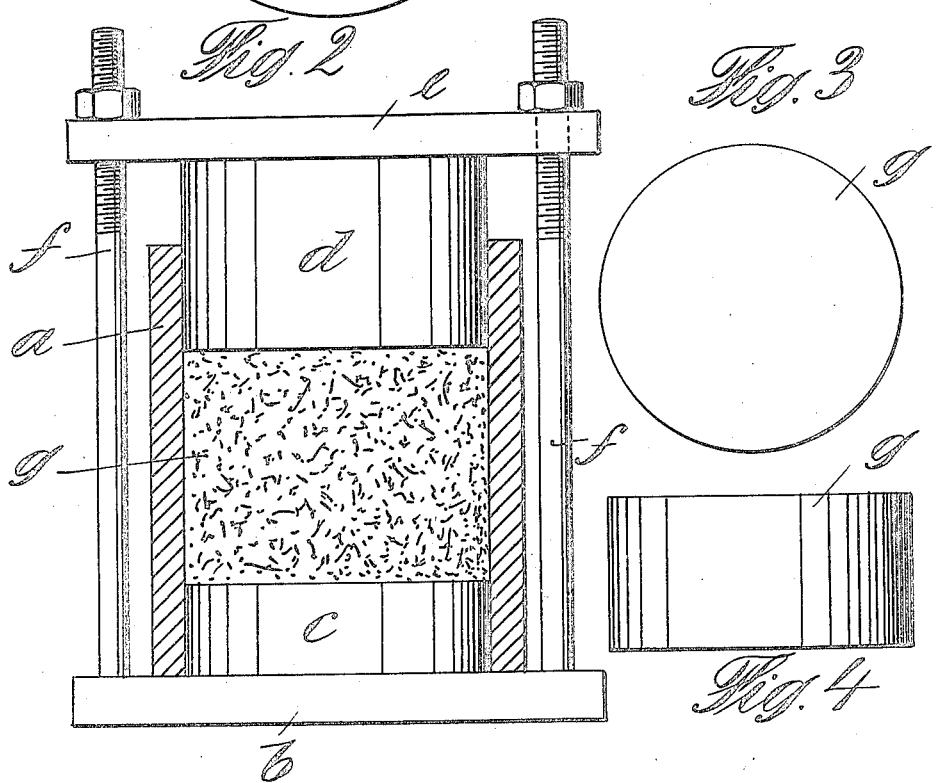

UNITED STATES PATENT OFFICE.

SIEGMUND SBOROWITZ, OF BERLIN, GERMANY, ASSIGNOR TO DEUTSCHE KONIT-GESELLSCHAFT M. B. H., OF STRALAU, NEAR BERLIN, GERMANY.

PROCESS OF MAKING ARTIFICIAL STONE AND PRODUCT OBTAINED THEREBY.

1,074,983.   Specification of Letters Patent.   Patented Oct. 7, 1913.

Application filed July 3, 1912. Serial No. 707,542.

*To all whom it may concern:*

Be it known that I, SIEGMUND SBOROWITZ, a citizen of the Empire of Austria-Hungary, residing at Berlin, in the Kingdom of Prussia, Germany, have invented certain new and useful Improvements in Processes of Making Artificial Stone and the Product Obtained Thereby; and I do hereby declare the following to be a full, clear, and exact description of the invention, such as will enable others skilled in the art to which it appertains to make and use the same.

My invention relates to improvements in a method of making artificial stone, and the product produced thereby.

More particularly my invention relates to a process in which the artificial stone is made by subjecting suitable raw materials within a mold *in vacuo* to pressure and heating the same.

It is the object of the improvements to provide a process by which the artificial stone can be made in a more simple and economical way.

With this object in view my invention consists in working the raw material in a state of fine comminution into a dough by means of binding elements the solvent agents of which having a high degree of volatility, putting the same into a closed but untight mold, subjecting the same to moderate pressure, and heating the same. After heating the material is again pressed, reheated, and finally rapidly cooled.

In order that my invention be more clearly understood, I shall describe hereafter the manner in which my improved process is best carried out, in connection with the accompanying drawing, in which:

Figure 1 is a top plan view of the apparatus. Fig. 2 is a vertical sectional view thereof. Fig. 3 is a top plan view of one of the plates. Fig. 4 is a front view of the same.

The vessel $a$ is provided with a bottom $c$. The material $g$ is inserted into the vessel and the cover $d$ closes the same. The vessel $a$ is disposed in a frame consisting of a fixed bottom plate $b$, and a slidable or adjustable plate $e$. The latter slides upon bolts $f$ and by tightening the nuts a suitable pressure on the cover can be obtained, as shown in Fig. 2.

The mass from which the artificial stone is made consists of amorphous substances such as ashes, sand, and the like, a suitable mineral dyestuff such as iron oxid, ocher, manganese black or the like, and if desired a mineral fiber material, which are mixed with suitable substances of a high degree of volatility, such for example as oils in solution. For example, copal oil may be used, which is dissolved in alcohol, benzin, or benzol. The mixture is filled into molds which are closed by means of a cover which is held in position by means of clamps or the like, but is not tightened. Thereupon the mold is pressed in the ordinary manner by gradually advancing the cover toward the inclosed mass, and is afterward put into a drying oven. Thereby gases are developed within the mass which try to escape. But as the mold is closed by the cover, a strong internal pressure is produced. Thereupon the mold is removed from the oven and again pressed in a filter press, whereupon it is again brought into the oven. Within the latter the gases of the solvent agent burn with a flame. Finally the mold is again removed from the oven, and if necessary again pressed, whereupon the product is taken from the mold and quickly cooled off. Now the product is ready for use.

The product which is thus obtained has a high resistance particularly against bending stresses. It is a good electrical insulator and can be worked by grinding, polishing, boring, and turning.

I claim herein as my invention:

1. The hereindescribed process of making artificial stone which consists in mixing a finely comminuted amorphous raw material with a binder dissolved in a solved agent of high volatility for forming a dough, subjecting the mass to moderate pressure and heat, repressing and reheating said mass and finally quickly cooling it off, substantially as described.

2. The hereindescribed process of making artificial stone which consists in mixing finely comminuted ashes with a binding medium dissolved in a highly volatile solvent agent into a dough, subjecting the mass to moderate pressure and heat, repressing and reheating said mass and finally rapidly cooling it off, substantially as described.

3. The hereindescribed process of making artificial stone which consists in mixing a finely comminuted amorphous raw material with a mineral dye and a binder dissolved in a highly volatile solvent agent, subjecting the mass to moderate pressure and heat, repressing and reheating said mass and finally chilling the same, substantially as described.

4. The hereindescribed process of making artificial stone which consists in mixing finely comminuted ashes with a mineral dye and a binder dissolved in a highly volatile solvent agent, subjecting the mass to moderate pressure and heat, repressing and reheating said mass, and finally chilling it, substantially as described.

5. The hereindescribed process of making artificial stone which consists in mixing finely comminuted amorphous raw material with a mineral dye and a mineral fibrous material and a binder dissolved in a highly volatile solvent agent, subjecting the mass to moderate pressure and heat, repressing and reheating said mass and finally quickly cooling it off, substantially as described.

6. The hereindescribed process of making artificial stone which consists in mixing finely comminuted ashes with a mineral dye and a mineral fibrous material, and a binder dissolved in a highly volatile solvent agent, subjecting the mass to moderate pressure and heat, repressing and reheating said mass, and finally quickly cooling it off, substantially as described.

7. The hereindescribed product which consists of a mixture of ashes bound together by an oil dissolved in a suitable volatile solvent and which is obtained by mixing ashes with the dissolved oil, pressing, heating, repressing and reheating the same and rapidly cooling off the product, substantially as described.

In testimony whereof I hereunto affix my signature in the presence of two witnesses.

SIEGMUND SBOROWITZ.

Witnesses:
 HENRY HASPER,
 WOLDEMAR HAUPT.